United States Patent [19]

Jung et al.

[11] Patent Number: 5,567,363
[45] Date of Patent: Oct. 22, 1996

[54] MANUFACTURING METHOD OF A POLYMER GRIN LENS USING SULFONATION

[75] Inventors: Sang-Don Jung; Seok-Ho Song, both of Daejeon, Rep. of Korea

[73] Assignee: Electronics & Telecommunications Research Inst., Daejeon, Rep. of Korea

[21] Appl. No.: 352,044

[22] Filed: Nov. 30, 1994

[30] Foreign Application Priority Data

Oct. 14, 1994 [KR] Rep. of Korea .................... 94-26392

[51] Int. Cl.$^6$ .................................................. B29D 11/00
[52] U.S. Cl. ............................................. 264/2.6; 264/1.1
[58] Field of Search .............................. 264/1.36, 1.37, 264/1.38, 2.6, 1.1

[56] References Cited

U.S. PATENT DOCUMENTS

| | | |
|---|---|---|
| 3,718,383 | 2/1973 | Moore . |
| 5,122,314 | 6/1992 | Bello et al. ............................ 264/2.6 |
| 5,405,556 | 4/1995 | Liu ....................................... 264/2.6 |

FOREIGN PATENT DOCUMENTS 56-13281  3/1981  Japan ..................................... 264/2.6

OTHER PUBLICATIONS

Koike et al–"Studies on the light–focusing plastic rod. 17: Plastic GRIN rod lens prepared by photocopolymerization of a ternary monomer system"; 1 Jun. 1984/vol. 23. No. 11/Applied Optics; pp. 1779–1783.

Ohtsuka et al–"Studies on the light–focusing plastic rod. 18: Control of refractive–index distribution of plastic radial gradient–index rod by photocopolymerization"; 15 Dec. 1985/vol. 24, No. 24/Applied Optics; pp. 4316–4320.

Iga et al–"Optimum diffusion condition in the fabrication of a plastic lenslike medium"; 15 May 1975/vol. 26, No. 10/Appl. Phys. Lett. pp. 578–579.

*Primary Examiner*—Mathieu D. Vargot
*Attorney, Agent, or Firm*—Larson and Taylor

[57] ABSTRACT

The present invention relates to a manufacturing method of a polymer GRIN lens which is used for focusing light in connections for example between two or more optical fibers and between an optical fiber and a light source in the optical communication field. The manufacturing method of a GRIN lens according to the present invention utilizes a characteristic of polystyrene that its refractive-index is decreased by sulfonation. The method includes polymerizing a sphere or rod made of a directional monomer that is capable of sulfonating like a styrene, together with a cross-linking agent, and a polymerization initiator; swelling the polymerized cross-linked polymer by using a predetermined solvent; and sulfonating the swollen cross-linked polymer using a sulfuric acid. Accordingly, the present method can be easily controlled to obtain the desired refractive-index distribution since the refractive-index distribution is determined by the diffusion of the sulfuric acid as a sulfonation.

13 Claims, No Drawings

MANUFACTURING METHOD OF A POLYMER GRIN LENS USING SULFONATION

BACKGROUND OF THE INVENTION

1. Field of the Invention

The present invention relates to a manufacturing method of a light-focusing polymer GRIN(gradient index) lens which is used for focusing light in connections in the optical communications field, such as between optical fibers and between an optical fiber and an optical source. More particularly, the present invention relates to a manufacturing method of a polymer GRIN lens using the characteristics that the refractive-index of a directional polymer material is decreased by sulfonation.

2. Description of the Related Art

Recently, according to developments in the optical communication technology, many kinds of light-focusing lens have been developed for manufacturing integrated optical components.

Specially, GRIN lens manufactured medium having a refractive-index that sequentially changes according to the position can sharply decrease an aberration through the refractive-index distribution control. It has merits in that alignment is easy and an optical loss from an error of the alignment is decreased by utilizing a shape that is not a parabola, but a plane or a sphere.

In manufacturing these GRIN lenses, a glass or a polymer, etc, is largely used as the medium.

In the case of glass, it is manufactured by an ion-exchange method. On the other hand, in the case of a polymer, it is manufactured by a copolymerization method.

In the case of the ion-exchange method, it is easy to estimate the refractive-index distribution because the refractive-index distribution is formed by the diffusion of an ion. On the other hand, it takes a long time in the processing because the diffusion speed of an ion inside of glass is slow. Also it has a problem in that the ion-exchange temperature is limited by the softening temperature of the glass, but the ion-exchange is achieved at a higher temperature in the range of about 300–700 degrees.

On the other hand, the manufacturing method of a polymer GRIN lens using the copolymerization method has merit in that a variety of materials and various types of refractive-index distribution, depending on the materials can be obtained by obtaining a refractive-index distribution by copolymerizing at a temperature below 100 degree two or more monomers having a different response speed and a different refractive-index.

However, according to the copolymerization method, in the copolymerization due to the temperature or ultraviolet rays, the difference between the maximum refractive-index and the minimum refractive-index values is reduced. This is the result because the diffusion of monomers having a lower refractive-index is simultaneously performed, and also, because there are many variables that have an effect due to the kind of monomer, and a relative mixture ratio of monomer, a density and temperature, etc of a polymerization initiator. However, it is difficult to quantify the variables that have an effect on the refractive-index distribution. Consequently, it is difficult to control a process to obtain an optimum refractive-index distribution.

SUMMARY OF THE INVENTION

The purpose of the present invention is to provide a manufacturing method of a polymer sphere and rod GRIN lens that can be controlled to obtain an optimum refractive-index distribution in which the formation of the refractive-index distribution can be estimated, even though the polymer used to manufacture the GRIN lens is a medium that is in the a more alleviated condition than in the case of a glass medium.

The manufacturing method of a polymer sphere and rod GRIN lens according to the present invention comprises the steps of:

polymerizing directional aromatic monomers that are capable of sulfonating such as a styrene with a cross-linking agent and a polymerization initiator as a sphere and a rod;

swelling the polymerized cross-linking agent by using a predetermined solvent; and sulfonating the swelled cross-linked agent with a sulfuric acid.

According to the present invention, an estimation and control of the refractive-index distribution are easy because the refractive-index distribution is determined by the diffusion time of the sulfuric acid and the temperature at a sulfonation for one kind of a monomer.

DETAILED DESCRIPTION OF THE INVENTION

A preferred embodiment according to the present invention will be described below.

The first process is a process for forming a cross-linked polymer of a rod or sphere.

Firstly, after a directional aromatic monomer having a hydrophobicity and capable of a sulfonation, such as styrene or naphthalene, is mixed with a cross-linking agent and a polymerization initiator, such as a divinylbenzene, a suspension polymerization is made.

The suspension polymerized polymer becomes a sphere cross-linked polymer having an equal refractive-index distribution.

At this time, in manufacturing a rod GRIN lens, a rod cross-linked polymer is obtained by putting the mixed material into a tube, such as a glass, and polymerizing it. In this case it does not matter whether the directional monomer has a hydrophilicity. The refractive-index distribution becomes equal over an entire rod like a sphere polymer.

A second process is a process of putting and swelling a sphere and rod cross-linked polymer which is formed by the first process into a solvent.

At this time, in the case of a cross-linked polymer polymerized as a rod, the swelling process is performed after the tube is removed. The reason for swelling the cross-linked polymer is to more easily diffuse a sulfuric acid within the cross-linked polymer at a sulfonation which is next step.

A third process is a process of sulfonating by putting the swelled cross-linking polymer made through the above process into a sulfuric acid which is maintained at a predetermined temperature. The sulfonating temperature is approximately 70 to 100 degrees.

Since the cross-linking polymer surface which is formed by a rod or sphere type is directly contacted with the sulfuric acid, the surface is heavily sulfonated, and the inside of the sphere and rod is gradually sulfonated by the diffusion of the sulfuric acid.

The more the sulfonation increases, the more the refractive-index ratio decreases. That is to say, the refractive-index is disproportionate to the degree of sulfonation.

Accordingly, by properly controlling the diffusion time of the sulfuric acid, a GRIN lens having the highest refractive-index at the center portion of the sphere and rod and having a gradually decreasing refractive-index from the center portion of the sphere and rod to the outside portion can be manufactured.

As described above, the refractive-index distribution of the GRIN lens is dependent on the degree of sulfonation, and the degree of sulfonation is determined by the diffusion time of the sulfuric acid and the temperature at the sulfonation.

Specially, since the refractive-index distribution is determined by the diffusion of the sulfuric acid, it is easy to model the diffusion time to produce the desired effect on the refractive-index distribution, and to estimate the formation of the refractive-index distribution.

Accordingly, the manufacturing method of the present invention can produce a rod and sphere type GRIN lens having a refractive-index distribution capable of greatly decreasing the aberration as well as making the control of the manufacturing process easy.

Also, the manufacturing method of the present invention is similar to the process for manufacturing a positive ion exchange resin of the sphere type by sulfonating the suspension copolymerization of styrene and divinylbenzene.

Accordingly, the present invention can reduce costs of manufacture because the manufacturing methods of a general positive ion exchange resin can be applied to the present invention.

By this time, in the case of the positive ion exchange resin that is mainly used in removing ions in water, the resin particle sulfonates to the center portion of the sphere in order to maximize the ion exchange capability. On the other hand, the present invention unequally sulfonates for obtaining refractive-index distribution.

Further, in the case of applying the present method to the manufacture of a rod lens, since it can sulfonate by polymerizing a directional monomer in which a hydrophilicity substituent is attached as well as hydrophobicity, the present invention can easily control a maximum and minimum refractive-index values through a chemical medium.

The effects of the present invention are as follows.

Firstly, with the present method, one can easily estimate and control the refractive-index distribution since the refractive-index distribution is determined by the diffusion of the sulfuric acid.

Secondly, the present method can reduce the costs of manufacture since the manufacturing process of the positive ion exchange resin which uses a general sulfonation can be applied to this invention.

Thirdly, the present invention can manufacture GRIN lenses having a variety of maximum and minimum refractive-index values since the directional monomer capable of sulfonating, such as a derivative of styrene which is variously substituted, can be used as a medium for the lens.

What is claimed is:

1. Manufacturing method for making a sphere shaped polymer GRIN lens comprising the steps of:

forming a sphere shaped cross-linked polymer by suspension polymerization, after an aromatic monomer capable of sulfonating and having hydrophobicity is mixed with a polymerization initiator and cross-linked to form said cross-linked polymer;

swelling said cross-linked polymer by using a predetermined solvent; and sulfonating said swelled cross-linked polymer so as to have the highest refractive-index distribution at a center portion of said sphere and a gradually decreasing refractive-index distribution outwardly from said center of said sphere by using a sulfuric acid which is heated at a predetermined temperature.

2. Manufacturing method of a rod shaped polymer GRIN lens comprising steps of:

forming a rod shaped cross-linked polymer by putting a mixture material into a tube and polymerizing it, said mixture material comprising an aromatic monomer capable of sulfonating and having hydrophobicity and hydrophilicity and a polymerization initiator;

swelling said cross-linked polymer by using a predetermined solvent, after said tube is removed; and sulfonating said swelled cross-linked polymer so as to have the highest refractive-index distribution at a center portion of said rod and a gradually decreasing refractive-index distribution outwardly from said center of said rod by using a sulfuric acid which is heated at a predetermined temperature.

3. A method for making a polymer GRIN lens comprising the steps of:

providing an aromatic monomer capable of sulfonating and having hydrophobicity;

mixing a polymerization initiator with said monomer to form a polymerization suspension and to form a cross-linked polymer having a geometrical shape with a center portion and a surface in said suspension;

swelling said cross-linked polymer by using a predetermined solvent; and sulfonating said swelled cross-linked polymer so as to have the highest refractive-index distribution at said center portion and a gradually decreasing refractive-index distribution outwardly from said center portion by using a sulfuric acid which is heated at a predetermined temperature.

4. A method for making a polymer GRIN lens as claimed in claim 3 wherein said geometrical shape is a sphere.

5. A method for making a polymer GRIN lens as claimed in claim 3 wherein said geometrical shape is a rod.

6. A method for making a polymer GRIN lens as claimed in claim 3 wherein said provided monomer is a directional monomer.

7. A method for making a polymer GRIN lens as claimed in claim 6 wherein said monomer is selected from the group consisting of styrene and naphthalene.

8. A method for making a polymer GRIN lens as claimed in claim 3 wherein said monomer is styrene.

9. A method for making a polymer GRIN lens as claimed in claim 8 wherein said sulfonating temperature is approximately 70 to 100 degrees.

10. A method for making a polymer GRIN lens as claimed in claim 3 wherein said sulfonating temperature is approximately 70 to 100 degrees.

11. A method for making a polymer GRIN lens as claimed in claim 3 wherein the surface of said cross-linked polymer is directly contacted with sulfuric acid so as to heavily sulfonate said surface.

12. A method for making a polymer GRIN lens as claimed in claim 3 wherein said polymerization initiator is a divinylbenzene.

13. A method for making a polymer GRIN lens as claimed in claim 12 wherein said provided monomer is a directional monomer and is selected from the group consisting of styrene and naphthalene;

wherein said sulfonating temperature is approximately 70 to 100 degrees; and wherein the surface of said cross-linked polymer is directly contacted with sulfuric acid so as to heavily sulfonate said surface.

* * * * *